Sept. 29, 1953 R. H. WHISLER, JR., ET AL 2,653,682
SHOCK ABSORBER
Filed Dec. 17, 1949
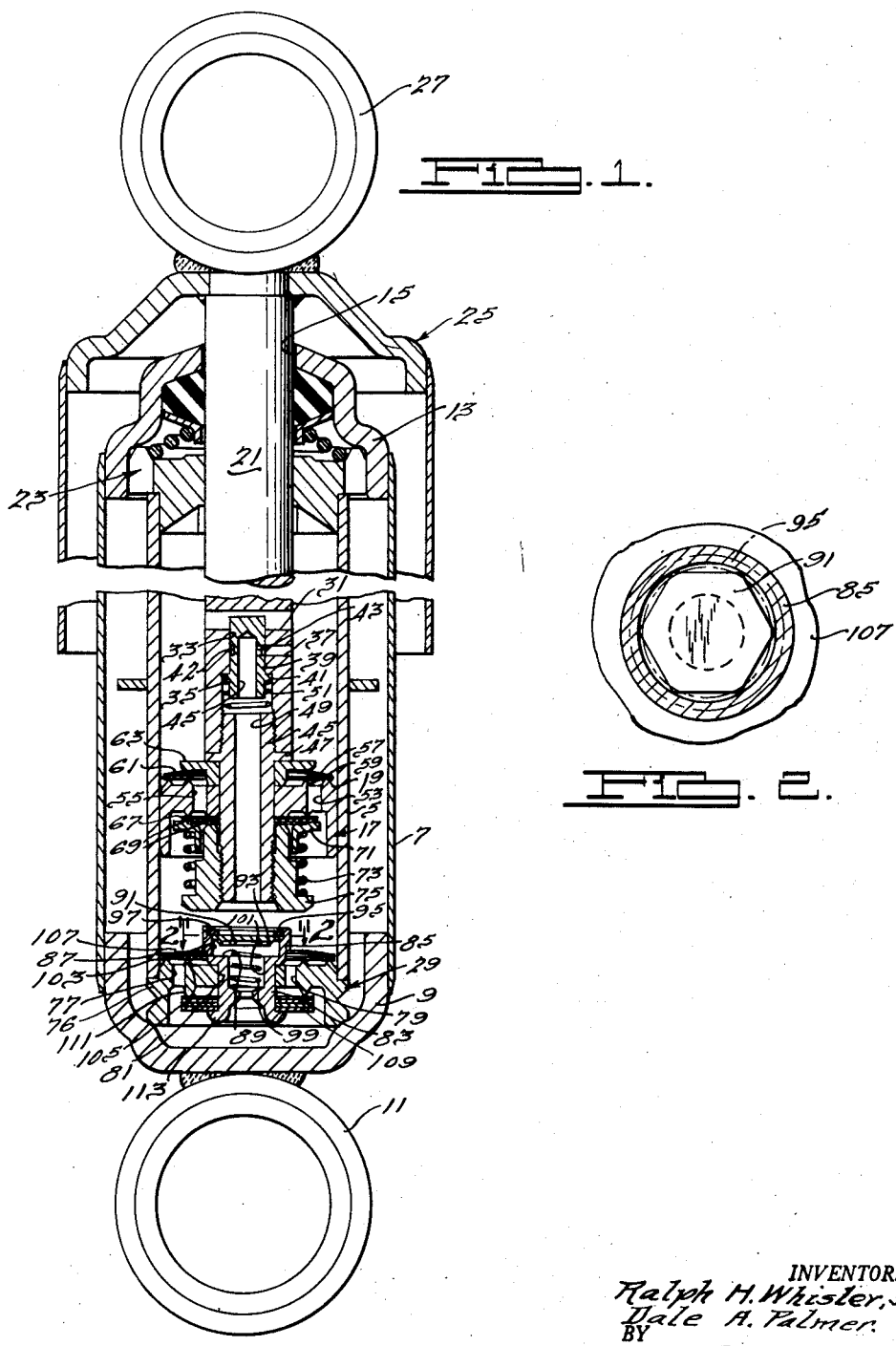
INVENTOR.
Ralph H. Whisler, Jr.
Dale A. Palmer.
BY
Harness, Dickey & Pierce
ATTORNEYS.

Patented Sept. 29, 1953

2,653,682

UNITED STATES PATENT OFFICE 2,653,682

SHOCK ABSORBER

Ralph H. Whisler, Jr., and Dale A. Palmer, Monroe, Mich., assignors to Patent Development Company, Monroe, Mich., a partnership Application December 17, 1949, Serial No. 133,522

6 Claims. (Cl. 188—88)

This invention relates to shock absorbers and more particularly to a novel, hydraulic, direct-acting, shock absorber.

The shock absorber of this invention is of the tubular type which includes a fluid containing pressure cylinder and a reserve chamber. A piston assembly is slidably disposed in the pressure cylinder and one end of the pressure cylinder is closed by means of a base compression valve which controls the flow of fluid between the pressure cylinder and reserve chamber, in order to compensate for piston rod displacement in the pressure cylinder. Both the piston assembly and the compression valve assembly include orifice means for normally by-passing fluid from one side of the assembly to the other, during movement of the piston assembly in one direction or the other. The assemblies also include valve means for controlling the flow of fluid through the assemblies in accordance with fluid pressure. Means are provided in each of the assemblies for at least partially closing the orifice means prior to actuation of the valve means of the assembly, so that at relatively low fluid pressures orifice control in the shock absorber is provided, while at higher fluid pressures pressure valve control is provided. That is, the shock absorber of this invention incorporates diminishing orifice means which aid in the provision of a better and smoother operating shock absorber. Thus, with the shock absorber of this invention efficient control is provided for both high and low shock absorber fluid pressures and velocities, thus providing a better ride in a vehicle, on which the shock absorber is mounted, on both smooth and irregular road surfaces.

It is therefore an object of this invention to provide a shock absorber of the aforementioned type, which is constructed so as to provide efficient shock absorber control irrespective of the fluid pressure or velocity therein.

It is a still further object of this invention to provide a shock absorber of the aforementioned type, which, when mounted on a vehicle, will provide a better vehicle ride over both smooth and irregular road surfaces.

It is a still further object of this invention to provide a shock absorber of the aforementioned type, which is relatively simple in construction, durable in use, efficient in operation, and positive in control.

These and other objects of this invention will become apparent from the following detailed description, taken in conjunction with the accompanying drawing, in which:

Figure 1 is a longitudinal sectional view of the shock absorber of this invention; and Figure 2 is a sectional view of the structure illustrated in Figure 1, taken along the line 2—2 thereof.

Referring now to the drawing, it will be seen that the shock absorber includes a pressure cylinder 5 and a reserve tube 7, which is concentric with the pressure tube 5 and cooperates with the latter to provide a reserve chamber in the shock absorber. The lower end of the reserve tube 7 is closed by means of a suitable closure member 9, having a fitting 11 connected thereto for attaching one end of the shock absorber to a vehicle or any other suitable device. The upper end of the reserve tube 7 is closed by means of a suitable closure member 13, having a central aperture 15 therein, for a use which will hereinafter appear. A piston assembly 17 is slidably disposed in the pressure cylinder 5, and the pressure cylinder and reserve tube are adapted to contain hydraulic fluid in a conventional manner. The piston assembly 17 includes a piston body 19 and a rod 21. The lower end of the rod 21 is connected to the piston in body 19, in a manner which will be hereinafter described, and the upper end of the rod extends through a closure and sealing assembly 23, which is connected with the upper end of the pressure tube 5 and engages the closure member 13 of the reserve tube 7. The piston rod extends through the aperture 15 in the closure member 13 and has a dust tube assembly 25, and an attaching fitting 27 connected therewith, in any suitable manner. The attaching fitting 27 is adapted to be connected to a portion of a vehicle or other suitable device so that upon relative movement of the sprung and unsprung portions of a vehicle or device, the piston assembly 19 will move relatively to the pressure cylinder 5 and reserve tube 7. The lower end of the pressure cylinder 5 is closed by means of a base compression valve assembly 29 which communicates with the pressure cylinder as well as the lower portion of the reserve chamber, and is adapted to control the flow of fluid between the pressure cylinder and the reserve chamber, as will hereinafter appear.

The piston rod 21 is provided with a transversely extending aperture 31 intermediate the ends thereof, and above the piston body 19. A longitudinally extending passageway 33 communicates with the passageway 31 and is enlarged intermediate the ends thereof to provide a plunger or valve seat 35. The piston rod is also provided with a transversely extending passageway 37, which extends inwardly from one side of the rod to communicate with the longitudinal passageway 33, below the passageway 31. A plunger 39 is slidably disposed in the passageway 33 and has an annular shoulder 41, intermediate the ends thereof, for engagement with the plunger seat 35. The plunger is provided intermediate the ends thereof, with a circumferential groove 42 communicating with a transversely extending passageway 43, and with a longitudinally extending passageway 43, the upper end of which terminates adjacent the upper end of the plunger and the lower end of which extends through the bottom of the plunger. When the plunger shoulder 41 is in engagement with the seat 35, the upper end of the plunger is disposed in the piston rod transverse passageway 31 and the plunger groove 42 is in alignment or registry with the piston rod transverse passageway 37. A stud 45 is threaded into the lower end of the enlarged portion of the piston rod passageway 33 and is provided with a shoulder 47, which abuts against the bottom of the piston rod. The stud 45 has a longitudinally extending aperture 49 therethrough, which communicates at the upper end with the piston rod passageway 33 and at the lower end with the pressure cylinder 5. A coil spring 51 is disposed between the upper end of the stud 45 and the shoulder 41 on the plunger 39, so as to resiliently retain the plunger shoulder 41 in engagement with the plunger seat 35 of the piston rod.

The piston body 19 is provided with an outer set of circumferentially spaced, vertically extending passageways 53 and an inner set of circumferentially spaced passageways 55. The outer set of passageways 53 have their upper ends normally closed by means of a disk 57 which rests upon radially spaced lands 59 formed on the top surface of the piston body 19. The disk 57 is resiliently held in a closed position by means of a star spring 61, which is loaded by means of a flanged collar member 63, disposed between the top surface of the piston body 19 and the under side of the stud shoulder 47. The disk 57 is adapted to be moved off of its seat by fluid pressure flowing upwardly through the passageways 53 during downward movement of the piston assembly, as will hereinafter appear. The lower ends of the piston passageways 55 are normally closed by means of laminated disks 67 which rest upon radially spaced lands 69 on the bottom surface of the central piston body portion. The disks are resiliently held in engagement with the lands 69 by means of a flanged collar member 71 and a coil spring 73 which is disposed between the under side of the member 71 and the head of a nut 75 which is threaded on the lower end of the stud 45. The nut 75 secures the piston rod to the piston body 19 and secures the entire piston assembly in the desired relationship, while at the same time loading the coil spring 73, so as to apply a predetermined resilient pressure against the disks 67. The disks 67 are adapted to be moved off of their seats or lands 69 by fluid pressure flowing through the passageways 55 during upward movement of the piston assembly, and the plunger 39 is adapted to be moved downwardly against the action of its coil spring 51, so as to move the groove 42 and passageway 43 thereof out of registration with the piston rod passageway 37 and thereby close off the passageway 37 against the flow of fluid therethrough and through the stud passageway 49 to the opposite side of the piston assembly, during upward movement of the piston, as will hereinafter appear. It should, however, be pointed out, and will hereinafter more fully appear, that the valve disks 67 will not move off of their piston body lands 69 until after the plunger 39 has been moved downwardly at least a predetermined amount so as to at least partially close off the orifice. In certain instances it may be desirable that the orifice be completely closed before the disks are moved off of their seats, and in other instances it may be desirable that the disks move off their seat when the orifice is only partially closed.

The base compression valve assembly 29 includes a valve body 76 having an outer set of circumferentially spaced passageways 77 therethrough and an inner set of circumferentially spaced passageways 79. The valve body is also provided with a central bore or aperture 81, in which is disposed a tubular valve cage member 83. The valve cage member 83 has an enlarged head portion 85, which rests upon the top surface of the valve body 76. The cage head portion 85 is recessed at 87 to provide a valve seat 89 at the lower end thereof. Slidably mounted in the recess 87 is a hexagonal shaped valve member 91 having an annular shoulder 93 on the lower surface thereof, which is adapted to rest upon the valve seat 89. A washer 95 is disposed in the upper end of the recess 87 and the top of the valve cage head 85 is crimped or rolled at 97 to hold the washer in place. The washer 95 acts to limit the upward movement of the valve member 91, and the valve member is normally and resiliently held in engagement with the washer 95 by means of a coil spring 99 disposed in the enlarged portion of a passageway 101 extending through the valve cage 85. As can be seen in Fig. 2, when the valve member 91 is in its uppermost position fluid can flow from the pressure cylinder through the spaces between the flat portions of the hexagonal periphery of the valve member and the inner periphery of the wall of the recess 87, thus providing a normally open orifice through the compression valve assembly 29, from the pressure cylinder to the reserve chamber.

The upper ends of the compression valve openings 77 are normally closed by means of a disk 103 engaging lands 105 on the top surface of the valve body 76. The disk 103 is resiliently loaded through a star spring 107 which in turn is loaded and held in position by the head portion 85 of the valve cage. The lower ends of the valve body passageway 79 are normally closed by a stack of disks 109 which engage an annular land 111 on the bottom of the central portion of the valve body 76. The disks are held in position and are loaded by spinning over the bottom portion of the valve cage at 113. During downward movement of the piston assembly 17, at low pressures, fluid can flow past the valve member 91 and through the valve cage passageways 101 into the reserve chamber, thus providing an orifice between the pressure cylinder and reserve chamber. However, as the fluid pressure increases, the valve member 91 will be moved downwardly until it engages the valve cage seat 89, at which time the orifice will be closed and fluid cannot pass from the pressure cylinder to the reserve chamber until sufficient pressure is built up to move the valve disks 109 off their seat and permit fluid to flow through passageway 79. However, in certain instances it may be that the valve disks 109 will open passageway 79, prior to the complete closing of the orifice. This, of course, can be controlled by varying the resistance of spring 99 and the loading of disks 109. During upward movement of the piston assembly 17, fluid can flow from the reserve chamber to the pressure cylinder so as to keep the same continually filled, through the valve passageway 77 and past the valve disk 105, which is loaded only very lightly through the star spring 107.

When the shock absorber is mounted between the sprung and unsprung portions of an automotive vehicle, or some other suitable device, relative movement of these portions will cause movement of the piston assembly 17 in the pressure cylinder 5. When the piston assembly 17 moves downwardly in the pressure cylinder 5, at a very low velocity and therefore without building up very much fluid pressure in the pressure cylinder, between the piston assembly 17 and the base valve assembly 29, fluid can flow past the compression valve member 91 through the valve cage passageway 101 and into the reserve chamber. As the velocity of the piston assembly increases and the fluid pressure increases, the valve member 91 will be moved downwardly so as to either partially or completely close off the passageway 101 against the flow of fluid. When sufficient pressure is built up, the valve disks 109 will be moved off of their seat by the fluid pressure flowing through the passageway 79 so as to permit fluid to flow from the pressure cylinder to the reserve chamber. The flow of fluid from the pressure cylinder to the reserve chamber is, of course, caused by piston rod displacement which results in fluid flowing through the piston passageways 53 and past the valve disk 57. Thus, on the compression stroke of the shock absorber orifice control is provided during relatively low piston velocities and low fluid pressures, so as to remove any harshness from the shock absorber action during such low velocities. If the orifice were not provided fluid could not flow from the pressure cylinder to the reserve chamber until the valve disks 109 were moved off of their seat. As a result, harshness in the ride of the vehicle would occur when the same was driven over very smooth roads. As the orifice is either completely or partially closed, when the piston velocity and fluid pressure pass a predetermined value, the valve disks 109 primarily control the flow of fluid from the pressure cylinder to the reserve chamber when the vehicle is being driven over relatively irregular roads, so that the proper control is provided under these conditions, as well as under smooth riding conditions, thus providing the desired control under all vehicle riding conditions.

During the rebound movement of the piston assembly 17, that is upward movement of the same, at relatively low velocities and low fluid pressures, fluid can flow through the piston rod passageway 37, plunger passageways 43 and 45, and through the stud passageway 39, to the lower side of the piston assembly, thus providing orifice control when the vehicle is moving over relatively smooth pavement. However, as the piston velocity, and thus the fluid pressure in the upper portion of the pressure cylinder, increases, the plunger 39 will be moved downwardly by the fluid pressure acting on the upper portion thereof, so as to gradually close the orifice by moving the plunger passageway 43 out of registration with the piston rod passageway 37. After the orifice is either partially or completely closed, or the plunger passageway 43 moved partially or completely out of registration with the piston rod passageway 37, all or the majority of the fluid will flow from the upper portion of the pressure cylinder to the lower portion thereof through the piston passageways 55. Thus, at higher piston velocities and fluid pressures, the disks 67 primarily control the shock absorber rebound action, and thus properly dampen the vehicle spring action. As the piston assembly moves upwardly in the pressure cylinder, the lower portion of the pressure cylinder is replenished by fluid flowing from the reserve chamber through the compression valve passageways 77 and past the disk 103.

Thus, during both the compression and rebound strokes of the shock absorber, orifices are provided for taking any harshness out of the shock absorber action and providing the necessary and desirable control, but as the piston velocity and fluid pressure in the shock absorber increase, the orifices are diminished, i. e., either partially or completely closed so that the valve disks primarily control the shock absorber. The shock absorber of this invention therefore provides a smooth vehicle ride for both smooth road conditions and irregular road conditions, and eliminates harshness, which has been present in heretofore known shock absorbers, under either one or the other of these conditions.

What is claimed is:

1. A shock absorber including a pressure cylinder adapted to contain fluid, a piston assembly slidably disposed in said pressure cylinder including operating rod means and a piston body connected with said rod means adjacent one end thereof, said rod means having passageway means therein to permit fluid to flow from one side of said piston body to the other side thereof, plunger means slidably supported in said rod means and having passageway means therein adapted to register with the passageway means in said operating rod means to permit fluid to pass therethrough, resilient means normally supporting said plunger in said rod means so that the passageway means thereof are in registration with the rod means passageway means, said plunger means being actuable by fluid pressure in said pressure cylinder during movement of said piston in one direction so as to cause said plunger means passageway means to move at least partially out of registration with said rod passageway means and thereby prevent or at least reduce the flow of fluid from one side of said piston to the other, and additional valve means associated with said piston body normally preventing the flow of fluid from the one side of said piston body to the other side thereof, and being actuable by fluid pressure after said plunger passageway means are moved at least partially out of registration with said rod passageway means to primarily control the flow of fluid from one side of said piston body to the other.

2. A shock absorber including a pressure cylinder and a reserve chamber adapted to contain fluid, a piston assembly in said cylinder, a valve assembly closing one end of said pressure cylinder and controlling the flow of fluid between said pressure cylinder and reserve chamber, said valve assembly including a valve body, said valve body having a passageway therethrough permitting the flow of fluid from said pressure cylinder to said reserve chamber during movement of said piston assembly in one direction, one end of said passageway being enlarged to provide a recess having a valve seat, a valve member slidably mounted in said recess and shaped so as to permit fluid to flow between said member and the periphery of said recess, resilient means normally retaining said valve member off of said recess valve seat to permit a flow of fluid through said passageway, said member being actuable by fluid pressure to move against said resilient means and toward said recess valve seat so as to prevent or at least reduce the flow of fluid from said pressure cylinder to said reserve chamber, additional valve means associated with said valve body, and normally preventing the flow of fluid from said pressure cylinder to said reserve chamber, but being actuable after said valve member approaches said seat to primarily control the flow of fluid from said pressure cylinder to said reserve chamber.

3. A shock absorber including a pressure cylinder and a reserve chamber adapted to contain fluid, a valve assembly controlling communication between said pressure cylinder and reserve chamber, a piston assembly slidably disposed in said pressure cylinder, means providing an orifice in said piston assembly normally permitting the flow of fluid from one side of said piston assembly to the other side thereof during movement of said piston assembly in one direction, a normally open element actuable by fluid pressure to close the said orifice as the fluid pressure increases and reaches a predetermined value, resilient means for retaining said element in said normally open position but permitting the same to move to said closed position under said predetermined fluid pressure, a passageway in said piston assembly and valve means normally preventing the flow of fluid through said passageway from one side of said piston to the other side thereof, when said piston moves in said one direction, said valve means being actuable by fluid pressure only after said orifice is at least partially closed.

4. A shock absorber including a pressure cylinder and a reserve chamber adapted to contain fluid, a piston assembly slidably disposed in said pressure cylinder and adapted to control the flow of fluid from one side thereof to the opposite side thereof during relative movement between said piston assembly and pressure cylinder, a valve assembly controlling communication between said pressure cylinder and reserve chamber, means providing an orifice in said valve assembly normally permitting the flow of fluid from one side of said valve assembly to the other side thereof during movement of said piston assembly in one direction, a valve element actuable by fluid pressure so as to close said orifice as the fluid pressure increases, resilient means for retaining said valve element in said normally open position but permitting the same to move to its closed position under said predetermined fluid pressure, valve means in said valve assembly normally preventing the flow of fluid from one side of said valve assembly to the other side thereof when said piston assembly moves in said one direction, said valve means being actuable by fluid pressure only after said orifice is at least partially closed, so as to thereby control the flow of fluid from one side of said valve assembly to the other side thereof.

5. A shock absorber including a pressure cylinder and a reserve chamber adapted to contain fluid valve means controlling communication between said pressure cylinder and reserve chamber, a piston assembly slidably disposed in said pressure cylinder, means providing an orifice in said piston assembly normally permitting the flow of fluid from one side of said piston to the other side thereof during movement of said piston in one direction in said pressure cylinder, normally open velocity responsive means in said piston assembly including an element and resilient means normally retaining said element in an open position relative to said orifice adapted to gradually close said orifice as the velocity of said piston increases, a passageway in said piston assembly through which fluid can flow from one side of said piston assembly to the other, pressure responsive means normally closing said passageway against the flow of fluid therethrough during movement of said piston assembly in said one direction.

6. A shock absorber including a pressure cylinder and a reserve chamber adapted to contain fluid, a piston assembly slidably disposed in said pressure cylinder and controlling the flow of fluid from one side to the other thereof during movement of said piston in said pressure cylinder, a valve assembly controlling the flow of fluid between said pressure cylinder and reserve chamber, means providing an orifice in said valve assembly normally permitting the flow of fluid from one side thereof to the other side during movement of said piston in one direction, a normally open velocity responsive element in said valve assembly for controlling the flow of fluid through said orifice and adapted to close said orifice against the flow of fluid therethrough when the velocity of said piston reaches a predetermined value, resilient means for retaining said element in said normally open position but permitting the same to move to its closed position under said predetermined fluid velocity, and pressure responsive means controlling the flow of fluid from one side of said valve assembly to the other side thereof, said pressure responsive means permitting the flow of fluid from one side of said valve assembly to the other only after the fluid pressure reaches a predetermined value.

RALPH H. WHISLER, JR.
DALE A. PALMER.

References Cited in the file of this patent

UNITED STATES PATENTS

| Number | Name | Date |
|---|---|---|
| 2,078,364 | Becker et al. | Apr. 27, 1937 |
| 2,240,644 | Focht | May 6, 1941 |
| 2,355,491 | Whisler | Aug. 8, 1944 |
| 2,384,186 | Magrum et al. | Sept. 4, 1945 |
| 2,403,648 | Focht | July 9, 1946 |
| 2,473,043 | Whisler | June 14, 1949 |